United States Patent
Pagels et al.

(10) Patent No.: US 6,250,201 B1
(45) Date of Patent: Jun. 26, 2001

(54) THROTTLE DEVICE FOR HYDRAULIC ADJUSTMENT DEVICES IN MOTOR VEHICLES

(75) Inventors: Olaf Pagels, Bergrheinfeld; Angelika Ebert, Schweinfurt; Boleslaw Tulaczko, Niederwerrn; Thomas Riess, Rattelsdorf/Mürsbach; Wolfgang Grosspietsch, Schweinfurt; Klaus Krappmann, Gochsheim, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/255,675

(22) Filed: Feb. 23, 1999

(30) Foreign Application Priority Data

Feb. 24, 1998 (DE) .................................. 198 07 447
Nov. 2, 1998 (DE) .................................. 198 50 323

(51) Int. Cl.⁷ ....................................................... F15B 11/08
(52) U.S. Cl. ............................................................... 91/443
(58) Field of Search ............................ 91/443; 137/513.3

(56) References Cited

U.S. PATENT DOCUMENTS

| 744,625 | * | 11/1903 | Sarver | 137/513.3 X |
|---|---|---|---|---|
| 1,435,331 | * | 11/1922 | Pasco | 137/513.3 X |
| 1,781,366 | * | 11/1930 | Campula | 137/513.3 |
| 2,136,898 | * | 11/1938 | Thomas | 137/517 |
| 2,353,161 | * | 7/1944 | Heigis et al. | 137/513.3 X |
| 2,391,211 | * | 12/1945 | White | 137/513.3 X |
| 2,632,476 | * | 3/1953 | Miller | 91/443 X |
| 2,716,997 | * | 9/1955 | Crookston | 137/513.3 X |
| 2,816,572 | * | 12/1957 | Pratt | 137/513.3 X |
| 2,886,065 | * | 5/1959 | Hershman | 137/513.3 X |
| 4,393,751 | * | 7/1983 | Kelley | 91/443 X |
| 4,531,543 | * | 7/1985 | Markley | 137/513.3 X |
| 4,531,624 | * | 7/1985 | Ideta | 137/513.3 X |
| 5,186,021 | * | 2/1993 | Keller | 137/513.3 X |
| 5,209,259 | | 5/1993 | Dear et al. . | |
| 5,655,567 | * | 8/1997 | Mikel | 137/513.3 |
| 5,868,161 | * | 2/1999 | Asbrand et al. | 91/443 X |
| 5,899,224 | * | 5/1999 | Moldenhauer | 137/513.3 X |
| 5,937,988 | * | 8/1999 | Otto et al. | 137/468 X |

FOREIGN PATENT DOCUMENTS

| 43 38 096 | 11/1994 | (DE) . |
|---|---|---|
| 43 34 551 | 4/1995 | (DE) . |
| 37 44 070 | 2/1996 | (DE) . |
| 197 30 030 | 1/1998 | (DE) . |
| 2 634 428 | 7/1988 | (FR) . |

\* cited by examiner

Primary Examiner—John E. Ryznic
(74) Attorney, Agent, or Firm—Cohen, Pontani, Lieberman & Pavane

(57) ABSTRACT

A throttle device for use with a hydraulic adjustment devices that have an input cylinder and an output cylinder and a hydraulic line filled with fluid connecting the output cylinder and the input cylinder, is arranged in the hydraulic line for establishing various throttle resistances to the flow of the fluid in both flow directions through the hydraulic line. The throttle device includes a disk with at least one boring and/or at least one passage channel. The disk moves back and forth, as the fluid flows, in both flow directions, and thereby strikes against a first stop in one direction and against a second stop in the other direction. The throttle device in the form of a disk in the movement space which is a transition from the hydraulic line to the supply line of the cylinder in its diameter, with a stop disk secured in the hydraulic line forming the second stop is economically advantageous. The disk that acts as the valve is distinguished by its low cost.

4 Claims, 3 Drawing Sheets

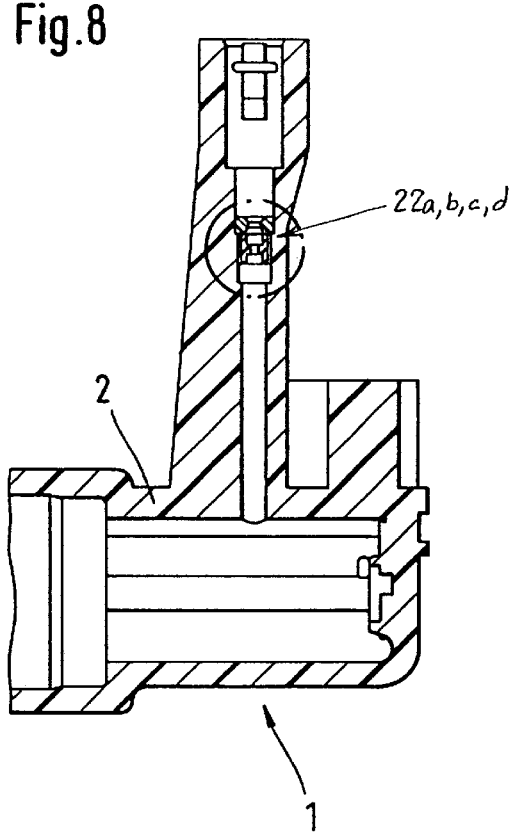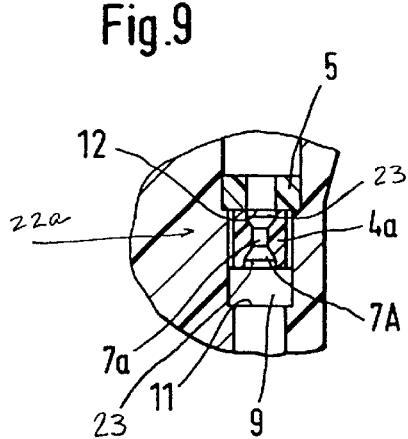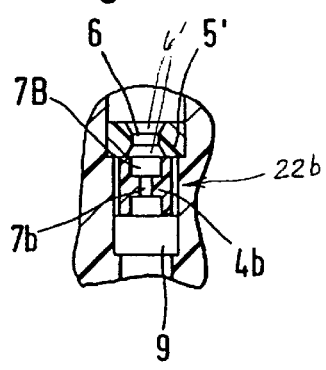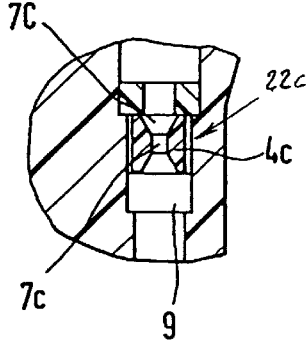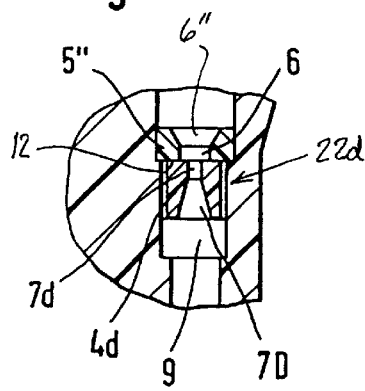

US 6,250,201 B1

THROTTLE DEVICE FOR HYDRAULIC ADJUSTMENT DEVICES IN MOTOR VEHICLES

BACKGROUND OF THE INVENTION

1. Field of the Invention

The present invention relates to a throttle device for use in hydraulic adjustment devices in motor vehicles. More specifically, the present invention relates to a throttle device for a hydraulic adjustment device for actuating a motor vehicle clutch.

2. Description of the Related Art

A prior art blocking-protected hydraulic brake system for vehicles is disclosed by German reference DE 37 44 070 C2. This prior art system comprises a main brake cylinder, a pressure medium supply tank and at least one wheel brake, which is connected to the main brake cylinder via a brake line and to the pressure medium supply tank via a relief line. A pressure modulation valve is located in each of the aforementioned lines, so that the pressurization or pressure relief of the wheel brakes can be implemented depending on pressure control signals. A pump that conveys pressure medium from the pressure medium supply tank is attached to the brake line via a pressure line. FIG. 1 of this prior art reference shows that a throttle valve (12' and 12") is connected between the pump and the main brake cylinder in the brake line piece between the main brake cylinder and the opening of the pressure line into the brake line. FIG. 2 of the reference shows that the throttle valve has a first check valve 61 that blocks flow toward the main brake cylinder and a second check valve which blocks flow in the opposing direction. The two check valves are connected in parallel fashion opened toward the main cylinder and the second check valve has a prestress force. Thus, when the pressure medium flows from the main brake cylinder to the wheel brake cylinder, the wheel brake cylinder can be operated at unhindered pedal speed. However, as long as the prestress is maintained in the second check valve, a maximum reset force is not exceeded upon aeration of the brakes. In addition, the pulsation of the operating pedal is so heavily damped by the continually open throttle valve as to no longer be experienced as unpleasant by the driver.

SUMMARY OF THE INVENTION

A throttle device in a hydraulic line according to the present invention is intended less to damp vibrations than to limit the maximum flow speed during operation in the first flow direction, and also to limit the flow speed to a certain value when the fluid is pushed back in a second flow direction. The throttle device may be used in a hydraulic actuator for a vehicle clutch in which the fluid flows in the first flow direction during disengagement of the clutch and the fluid is pushed back in the second direction via the diaphragm spring of the clutch. Limiting the flow speed in the second flow direction prevents torque peaks from occurring in the drive train when the transmission is connected to the crank shaft of the internal combustion engine. Such torque peaks arise due to excessively fast engagement of the clutch and lead to overload. The engagement speed is set at an experimentally established value, which is not exceeded even in the event of fast shifting. Although the system is equipped with a throttle to limit the engagement speed, the engagement speed must not be allowed to fall below a permissible lower limit, which may occur at low temperatures. If possible, the disengagement speed should not be impaired.

In designing throttle devices in hydraulic adjustment devices for motor vehicle clutches, it is necessary to take into account the noise created, in particular, at the high flow speeds reached when the clutch is engaged too quickly because the driver slips off the clutch pedal. It has therefore been necessary to equip the throttle device with a disk whose passageway has a diameter designed to prevent the static pressure from dropping locally below the damping pressure of the fluid to prevent cavitation of the fluid flowing through the throttle. The vapor bubbles formed during cavitation collapse and may produce sound radiations. In view of this characteristic, it is advantageous to equip the passage with a funnel-shaped inlet and/or outlet in the channel widenings that prevent the flow from separating at the passage and thereby prevent cavitation and noise associated with the collapse of the vapor bubbles formed during cavitation.

The object of the invention is to provide a throttle device for installation in a hydraulic adjustment device for a vehicle clutch that limits the engagement speed of the clutch to a maximum value without producing disturbing noise.

The object is met by a throttle device for installation between a cylinder of a hydraulic adjustment device having a housing and a cylinder interior and a hydraulic line for establishing a throttle resistance to a flow of hydraulic fluid in at least one of two opposing flow directions. The throttle device includes a disk having a passage movably mountable in the hydraulic line, the disk and the hydraulic line being configurable for forming a channel between the disk and the hydraulic line when the disk is mounted in the hydraulic line, a first stop for preventing movement of the disk past the first stop in one of the two opposing flow directions, and a second stop for stopping movement of the disk in the other of the two opposing flow directions, wherein the disk is movable between a first position whereat the disk abuts the first stop and a second position whereat the disk abuts said second stop.

The various features of novelty which characterize the invention are pointed out with particularity in the claims annexed to and forming a part of the dislcosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 8 is a cross-sectional view of another embodiment of the cylinder of FIG. 1 with a modified passage in the disk of the throttle device;

FIG. 9 is an enlarged detail of an embodiment of the throttle device of FIG. 8 with two funnel-shaped widenings in the passage;

FIG. 10 is an enlarged detail of another embodiment of the throttle device of FIG. 8 with two cylindrical widenings in the passage of the disk;

FIG. 11 is an enlarged detail of another embodiment of the throttle device of FIG. 8 with two conical widenings in the passage of the disk; and FIG. 12 an enlarged detail of yet another embodiment of the throttle device of FIG. 8 with a unilateral conical widening in the passage of the disk.

DETAILED DESCRIPTION OF THE PRESENTLY PREFERRED EMBODIMENTS

Figure 1:
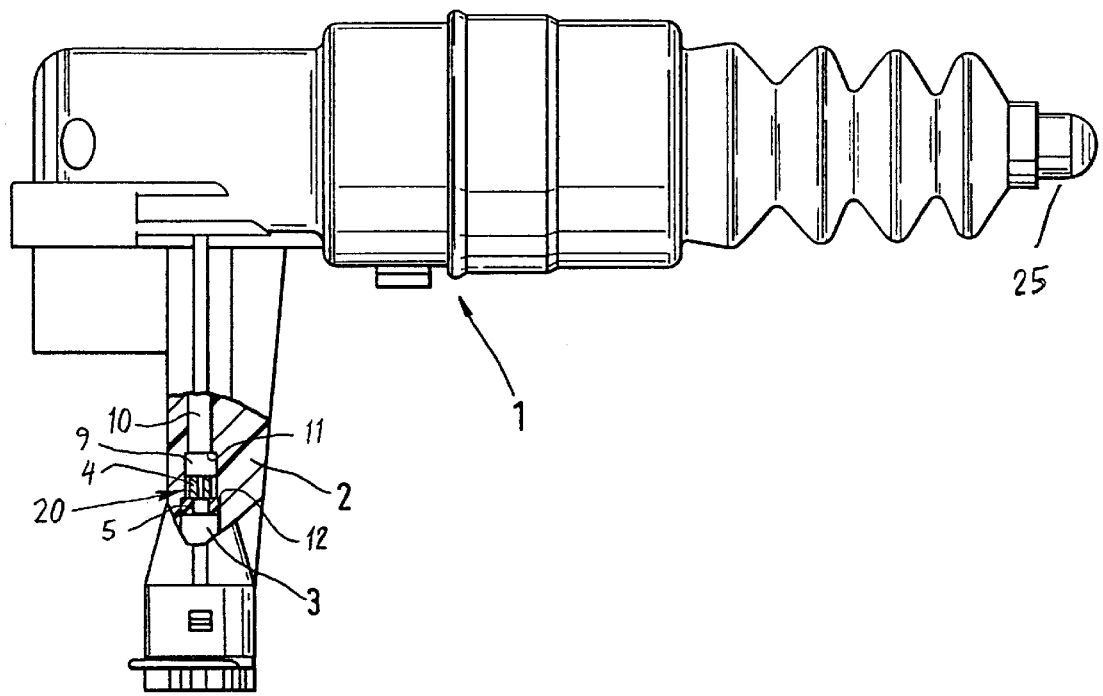
FIG. 1 shows an output cylinder of a hydraulic adjustment device with a throttle device in a hydraulic line according to an embodiment of the present invention.
Figure 2:
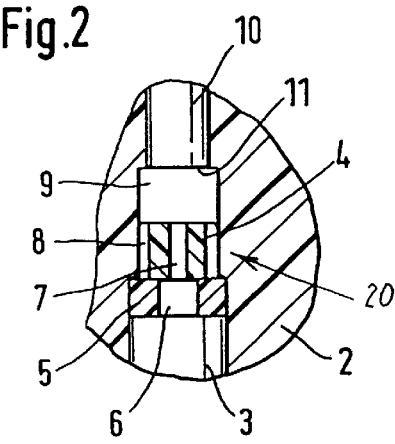
FIG. 2 is an enlarged view of the throttle device of FIG. 1 in a movement space between the hydraulic line and a supply line to the cylinder.
Figure 3:
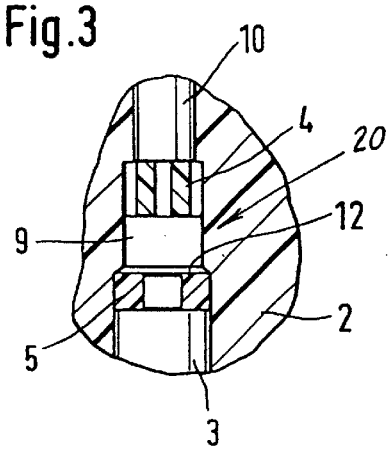
FIG. 3 shows the throttle device as in FIG. 2 in contact with a first stop of the movement space.

FIG. 1 shows a cylinder 1 of a hydraulic adjustment device for a motor vehicle clutch. The cylinder 1 comprises a housing 2, a hydraulic line 3 and a supply line 10 to the cylinder 1. Arranged between the hydraulic line 3 and the supply line 10 to the cylinder 1 is a throttle device 20. FIGS. 2 and 3 show enlarged views of the throttle device 20 which includes a movement space 9 in which a disk 4 is movably arranged for moving in a first flow direction of hydraulic fluid against a first stop 11 (see FIG. 3) and in a second flow direction against a second stop 12 (see FIG. 2). The first stop 11 is formed by a recess between the movement space 9 and the supply line 10 to the cylinder 1. The second stop 12 is formed by a stop disk 5 arranged in the hydraulic line 3 against a recess in the direction of the movement space 9 and has a passage opening 6. The disk 4 has a central boring 7 and at least one passage channel 8 on a circumference of the disk for conducting a flow of the hydraulic fluid.

Figure 4:
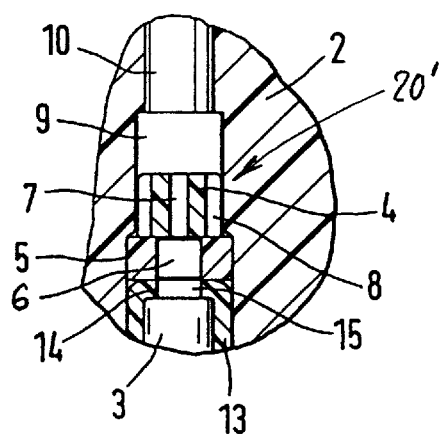
FIG. 4 is an enlarged view of another embodiment of the throttle device of FIG. 1.
Figure 5:
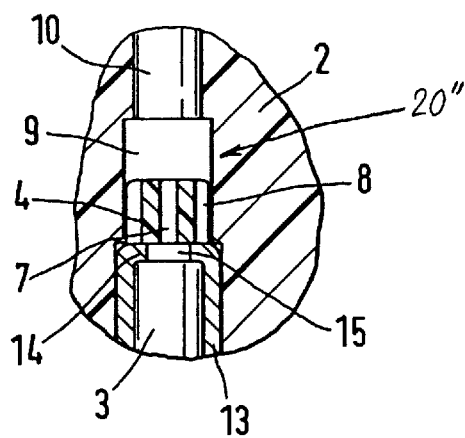
FIG. 5 shows another embodiment of the throttle device of FIG. 4.

FIGS. 4 and 5 show throttle devices 20', 20" with a line 13 inserted into the connection of the hydraulic line 3. The line end 14 has an edge-flanging forming a passage opening 15. In FIG. 4, the size of the passage opening 15 corresponds roughly to the passage opening 6 of the stop disk 5. In FIG. 5, the line 13 is moved against the recess of the second stop 12 such that the line end 14 forms the second stop 12 for the disk 4. The throttle device 20" of FIG. 5 does not include the stop disk 5.

Figure 6:
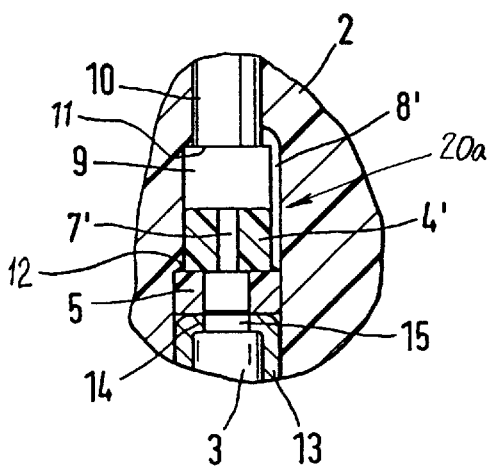
FIG. 6 shows another embodiment of the throttle device of FIG. 1 with a passage channel along the movement space in a housing.

FIG. 6 shows a throttle device 20a having a disk 4' with a passage 7', but no passage channels. Rather, in this embodiment, passage channels 8' are arranged in the housing 2 in the form of bypass lines, which run around the first stop 11 and end on the same plane with the second stop 12. As a result, when the disk 4' contacts the second stop 12, only the passage 7' acts as the total cross-sectional flow for the hydraulic fluid. When the disk 4' contacts the first stop 11, the sum of all passage channels 8' and the passage 7' act as the total cross-section for the flow of the fluid.

Figure 7:
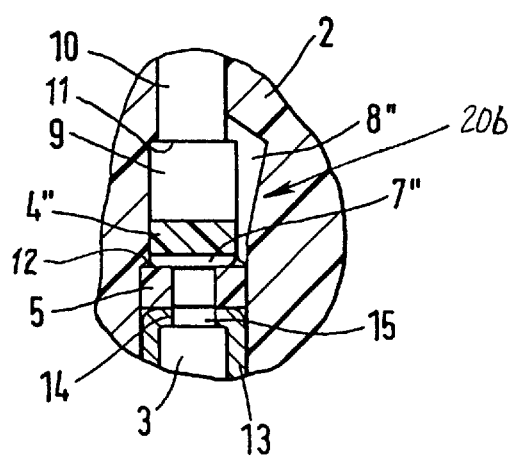
FIG. 7 shows another embodiment of the throttle device of FIG. 6 with a modified disk.

In FIG. 7, a throttle device 20b includes a disk 4" arranged in the movement space 9 with a passage 7" arranged on its front face and pointing toward the second stop 12. Further, arranged in the housing 2 are passage channels 8", which work similarly to the passages 8' shown in FIG. 6. The difference between the passage channels 8' and 8" being that the passage channels 8" have a varying cross-section along their length, so that the total cross-section for the flow of the fluid is enlarged as the disk 4" is moved toward the first stop 11.

The function of the throttle device 20, 20', 20", 20a, 20b in the adjustment device is described below in reference to the throttle device 20 shown in FIGS. 1–3. The cylinder 1 is assumed to be an output cylinder in a hydraulic adjustment device. When an operating pedal is operated, the hydraulic fluid is pressed through the hydraulic line 3 against the disk 4 and moves the disk 4 toward the first stop 11. After the disk 4 contacts the first stop 11, the hydraulic fluid flows though the passage 7 and the passage channels 8 and enters the cylinder 1 such that the operating element 25 moves to disengage the clutch. Upon releasing the operating pedal, the piston of the cylinder 1 is pushed back via the diaphragm spring of the clutch. The urgency of the diaphragm spring pushes the hydraulic fluid out of the cylinder 1 which pushes the disk back toward the second stop 12. When the disk 4 contacts the second stop 12, the fluid only passes the disk 4 through the passage 7. The passage channels 8 are covered by the stop disk 5 when the disk 4 contacts the second stop 12. Accordingly, the flow speed of the fluid from the cylinder 1 toward an input cylinder of the hydraulic adjustment device (not shown) is reduced. As a result of the reduced flow speed in the direction toward the input cylinder, the diaphragm spring of the clutch can only move back into the rest position at a maximum possible speed upon sudden release of the operating pedal. The flow conducting capacity of the passage 7 thus has direct influence on the functioning of the adjustment device in the motor vehicle, so that erroneous operations by the driver can be corrected. The operating speed limit prevents unpleasant jerks when the clutch is engaged during starting or gear shifts. Conversely, it is also possible to design the sum of all passage openings (namely, the passage 7 and the passage channels 8) in the direction of clutch operation or disengagement conducts a minimum amount of flow toward the cylinder 1 such that the operating pedal does not fall below a certain operating speed.

It is advantageous for the support surfaces of the disk 4, 4', 4" on the first stop 11 and/or on the second stop 12 to be equipped with a surface that prevents adhesion, so that the disks 4, 4', 4" are released from their rest positions from the first or second stop 11 or 12 without resistance when the flow of fluids begins in either direction. Conversely, the surface structure can also be attached to the surfaces of the first and/or second stop 11 and/or 12, in which case the disk 4, 4', 4" does not have to be surface-treated.

The economical placement of the disk 4 of the throttle device 20 in the movement space 9 is also advantageous. The movement space 9 is a transition from the hydraulic line 3 to the supply line 10 to the cylinder 1 in its diameter. Only the second stop 12 is formed by the stop disk 5 to be secured. The disk 4 acting as a valve is distinguished by its low cost.

High flow speeds during excessively fast operation of the clutch by the driver may cause impermissibly loud noises in the passage 7 of the disk 4 due to cavitation. To counter this phenomenon, a throttle device 22a in FIG. 9 has a disk 4a with a passage 7a including widenings 7A toward the front sides of the disk 4a. The widenings 7A are conical attachments to the passage 7a and may be identical to each other. The conical widening 7A may have a cylindrical end boring 23 at the wide ends of the widenings 7A. Alternatively, a throttle device 22c as shown in FIG. 11 may include widenings 7C without cylindrical end borings 23. The conical widening 7C at a passage 7c is located in a disk 4c of the throttle device 22c and retains its widening angle up to the respective front surfaces of the disk 4c. FIG. 10 shows another embodiment of a throttle device 22b with a disk 4b with a passage 7b connected to widenings 7B. Each of the widenings 7B comprises a cylinder and forms one step relative to the passage 7b. Associated with the disk 4b is a stop disk 5', which forms the stop 12, and whose passage opening 6 has two bevels 6a to widen this passage opening.

FIG. 12 shows a throttle device 22d having a disk 4d with a passage 7d connected to a widening 7D directed toward one of the two front surfaces of the disk 4d. In this embodiment, the disk 4d is asymmetrical in that one front surface of the disk 4d is connected to the passage 7d and the other front surface of the disk 4d is connected to the funnel-shaped widening 7D. The stop 12 is formed by a stop disk 5" that is also asymmetrical with a passage opening 6 pointing toward the toward the stop 12 and a bevel 6" on the planar surface located opposite to the stop 12. The bevel 6" constitutes a funnel-shaped widening.

In general, the conical widenings may also be attached to roundings. The mantle lines of the funnel-shaped widenings are empirically determined curves that represent an optimally minimized noise production during operation.

The invention is not limited by the embodiments described above which are presented as examples only but can be modified in various ways within the scope of protection defined by the appended patent claims.

We claim:

1. A throttle device for installation between a cylinder of a hydraulic adjustment device having a housing and a cylinder interior and a hydraulic line for establishing a throttle resistance to a flow of hydraulic fluid in at least one of two opposing flow directions, said throttle device comprising:

a disk having a passage movably mounted in a movement space arrangeable in said hydraulic line, said disk and said hydraulic line being configurable for forming a channel between said disk and said hydraulic line when said disk is arranged in said hydraulic line;

a first stop for preventing movement of said disk past said first stop in one of said two opposing flow directions;

a second stop for stopping movement of said disk in the other of said two opposing flow directions, wherein said disk is movable between a first position whereat said disk abuts said first stop and a second position whereat said disk abuts said second stop; and a widening at an end of said passage directed toward one of said first and second stops for reducing a flow noise of the fluid at high flow speeds, wherein said widening comprises a first widening directed toward said first stop and a second widening directed toward said second stop, each said first and second widenings comprising a funnel-shape and wherein said first and second widenings are identical.

2. A throttle device for installation between a cylinder of a hydraulic adjustment device having a housing and a cylinder interior and a hydraulic line for establishing a throttle resistance to a flow of hydraulic fluid in at least one of two opposing flow directions, said throttle device comprising:

a disk having a passage movably mounted in a movement space arrangeable in said hydraulic line, said disk and said hydraulic line being configurable for forming a channel between said disk and said hydraulic line when said disk is arranged in said hydraulic line;

a first stop for preventing movement of said disk past first stop in one of said two opposing flow directions;

a second stop for stopping movement of said disk in the other of said two opposing flow directions, wherein said disk is movable between a first position whereat said disk abuts said first stop and a second position whereat said disk abuts said second stop;

a widening at and end of said passage directed toward one of said first and second stops for reducing a flow noise of the fluid at high flow speeds; and a stop disk which a passage opening forming said second stop, wherein said stop disk further comprises a beveling at both ends of said passage opening in said stop disk.

3. A throttle device for installation between a cylinder of a hydraulic adjustment device having a housing and a cylinder interior and a hydraulic line for establishing a throttle resistance to a flow of hydraulic fluid in at least one of two opposing flow directions, said throttle device comprising:

a disk having a passage movable mounted in a movement space arrangeable in said hydraulic line, said disk and said hydraulic line being configurable for forming a channel between said disk and said hydraulic line when said disk is arranged in said hydraulic line;

a first stop for preventing movement of said disk past said first stop in one of said two opposing flow directions;

a second stop for stopping movement of said disk in the other of said two opposing flow directions, wherein said disk is movable between a first position whereat said disk abuts said first stop and a second position whereat said disk abuts said second stop;

a widening at an end of said passage directed toward one of said first and second stops for reducing a flow noise of the fluid at high flow speeds; and a stop disk with a passage opening forming said second stop, wherein said stop disk further comprises a funnel-shaped beveling toward one end of said passage opening.

4. The throttle device of claim 3, wherein said funnel-shaped beveling in said stop disk is arranged on a side of said stop disk facing away from said movement space.

* * * * *